(12) United States Patent
Paul et al.

(10) Patent No.: US 9,999,928 B2
(45) Date of Patent: Jun. 19, 2018

(54) SETTING SYSTEM AND TOOL

(71) Applicant: Kennametal Inc., Latrobe, PA (US)

(72) Inventors: Marcus Paul, Nuremberg (DE); Tilo Krieg, Fuerth (DE)

(73) Assignee: KENNAMETAL INC., Latrobe, PA (US)

( * ) Notice: Subject to any disclaimer, the term of this patent is extended or adjusted under 35 U.S.C. 154(b) by 106 days.

(21) Appl. No.: 15/257,976

(22) Filed: Sep. 7, 2016

(65) Prior Publication Data

US 2017/0165760 A1   Jun. 15, 2017

(30) Foreign Application Priority Data

Aug. 31, 2015   (DE) .................. 10 2015 114 456

(51) Int. Cl.
  *B23B 49/00* (2006.01)
  *B23B 29/034* (2006.01)
  *B23D 77/04* (2006.01)

(52) U.S. Cl.
  CPC ........ *B23B 29/03403* (2013.01); *B23D 77/04* (2013.01); *B23B 2240/04* (2013.01); *B23B 2260/108* (2013.01); *B23D 2277/08* (2013.01)

(58) Field of Classification Search
  CPC .......................... B23B 29/03403; B23D 77/04

USPC ......... 33/613, 626, 627, 628, 636, 638, 639, 33/641, 642, 645

See application file for complete search history.

(56) References Cited

U.S. PATENT DOCUMENTS

| | | | | |
|---|---|---|---|---|
| 4,756,648 | A * | 7/1988 | Cusack ............. | B23B 29/03403 408/150 |
| 9,676,037 | B2 * | 6/2017 | Herud ................. | B23B 31/1074 |
| 2008/0232909 | A1 * | 9/2008 | Filho ......................... | B23B 1/00 407/7 |
| 2012/0063861 | A1 * | 3/2012 | Wretland .............. | B23B 27/007 408/238 |
| 2014/0054951 | A1 * | 2/2014 | Bookhamer .......... | E21C 35/183 299/113 |
| 2015/0030398 | A1 * | 1/2015 | Frota De Souza ....... | B23C 5/10 407/33 |
| 2015/0202729 | A1 * | 7/2015 | Lin ..................... | B23Q 17/2225 33/639 |
| 2017/0341157 | A1 * | 11/2017 | Herud ................... | B23B 31/305 |

* cited by examiner

*Primary Examiner* — G. Bradley Bennett
(74) *Attorney, Agent, or Firm* — Matthew S. Bedsole

(57) ABSTRACT

A setting system (20) for a tool (10) is described, and in particular for a rotary metal working tool, wherein the setting system (20) aligns at least one insert (14) of the tool (10). The setting system (20) comprises an adjusting unit (22), which cooperates with the insert (14), and actuating device (24), which includes at least one electric actuator (26) exerting an adjusting force on the adjusting unit (22). Furthermore, a tool (10) is described.

17 Claims, 3 Drawing Sheets

SETTING SYSTEM AND TOOL

CLAIM FOR PRIORITY

This application claims priority from German Patent Application No. 1020151144565 filed Aug. 31, 2015, the entirety of which is incorporated herein by reference.

FIELD OF THE INVENTION

The invention relates to a setting system for a tool and to a tool comprising a setting system, and in particular to a metal working tool.

BACKGROUND

From the prior art, professional metal working tools such as reaming or broaching tools, or boring tools, are known, comprising a manual setting system that allows an insert of the tool, which is used to work the workpiece, in particular made of metal, to be set. Typically, a setting screw, which is adjusted by an operator of the tool, is provided for manually setting the insert. The setting screw acts directly on the insert, so that the position of the insert in the metal working tool is changed when the setting screw is accordingly rotated.

It is thus possible, for example, to change the active diameter of a reaming or broaching tool by adjusting the insert by a particular adjustment travel, whereby the radial distance of the insert with respect to the rotational axis of the reaming or broaching tool is changed. The reaming or broaching tool can thus be adapted to the diameter of a pre-drilled hole.

Analogously, it is thus also possible to set the diameter of a fine boring tool if the corresponding cutting inserts are disposed radially outside on a rotating shank of the fine boring tool. The radial distance of the cutting inserts can then, as described above, be adjusted with respect to the rotational axis of the shank so as to set the active diameter of the fine boring tool. The setting system of a boring tool is designed substantially analogously to that of a reaming or broaching tool.

It has been found to be a drawback of the known setting systems that precise setting and operator-independent, reproducible setting can be difficult to ensure, in particular in the µm range.

SUMMARY OF THE INVENTION

It is the object of the invention to provide an option that allows an insert of a tool to be set precisely and reproducibly in the tool.

The object is achieved according to the invention by a setting system for a tool, and in particular a rotary metal working tool, wherein the setting system aligns at least one insert of the tool, and wherein the setting system comprises an adjusting unit, which cooperates with the insert, and an actuating device, which includes at least one electric actuator exerting an adjusting force on the adjusting unit. The object is furthermore achieved according to the invention by a tool, and in particular a metal working tool, which comprises such a setting system. The metal working tool is preferably a rotary metal working tool.

The basic idea of the invention is to set the insert by way of an electric actuator, which is able to precisely adjust the insert. The electric actuator additionally ensures that the desired setting is reproducible, since it is independent of a manual actuation by an operator of the tool or of the setting system. The electric actuator is part of the actuating device that cooperates with the adjusting unit on which the insert is disposed. In this way, it is ensured that the actuation originating from the electric actuator is transmitted to the adjusting unit, which correspondingly transmits the actuation to the insert. The actuating device, and in particular the electric actuator, thus indirectly adjusts the insert by way of the interposed adjusting unit.

The adjusting unit and the actuating device can in particular cooperate such that the actuating device exerts an adjusting force on the adjusting unit which is perpendicular to the rotational axis of the rotary tool. In this way, it is possible to set the radial distance of the insert with respect to the rotational axis of the tool. The adjusting force exerted by the actuating device can act in a direction that is perpendicular to the rotational axis of the tool.

One aspect provides for the adjusting unit to comprise an adjusting pin and a clamping unit clamping the adjusting pin. The adjusting pin can cooperate directly with the actuating device and can be adjusted by the same. It is ensured by way of the clamping unit that the adjusting pin is held in the desired position after a deflection or movement by the actuating device. Since the insert is coupled to the adjusting pin, the insert is thus likewise held in the desired position. The insert can be disposed directly on the adjusting pin, or on a carrier that is connected to the adjusting pin.

According to a further aspect, the setting system comprises at least one power supply unit, to which the clamping unit and/or the electric actuator are electrically connected. The clamping unit is thus likewise an electric clamping unit, which can be actuated by way of a voltage signal. The clamping unit and/or the electric actuator are supplied with a voltage from the power supply unit. The applied voltage can release the clamping unit, which thus, in the de-energized state, exerts a clamping action on the adjusting pin. The power supply unit can, in general, be an external voltage source, for example a battery or a rechargeable battery, or a capacitor, which provides the required voltage when charged. The capacitor can in particular be provided in the tool itself In particular, the electric actuator and/or the clamping unit comprise at least one piezo element, preferably a piezoceramic, and/or at least one bimetal having piezoelectric properties. The piezoceramics can be what is known as a piezoelectric quartz. The piezoceramics and the bimetal having piezoelectric properties each represent a piezo element.

Furthermore, the electric actuator and/or the clamping unit can be a piezoelectric actuator. The piezoelectric element, which is to say the piezoceramics or the bimetal having piezoelectric properties, is thus operated such that a voltage is converted into a corresponding change in longitude of the piezoelectric element. The change in longitude may be a contraction or an expansion of the piezo element, which is the result of the applied voltage. In general, a voltage can be converted into a mechanical movement by the piezo element acting as an actuator.

A further aspect provides for the electric actuator to comprise at least two piezoelectric stacks, which are different in size. A piezoelectric stack, which is also referred to as a "piezo stack," comprises multiple piezo elements connected to each other. A piezoelectric stack can be used to carry out a greater change in longitude than is possible with a simple piezo element when a certain voltage is applied. By way of the differing sizes of the piezoelectric stack, it may be provided that a first piezoelectric stack has a change in longitude in the mm range, for example, while a second piezoelectric stack, which is smaller than the first piezoelectric stack, has a change in longitude in the nm range.

In addition or as an alternative, the piezoelectric stack can have a translation ratio unit, whereby a comparatively small change in longitude of the piezoelectric stack is translated into a larger change in longitude. In this way, it is possible to use a smaller and more cost-effective piezoelectric stack, which nonetheless results in a large change in longitude when it is supplied with a voltage.

A translation ratio unit may also be provided for a simple piezo element, which is included in the piezoelectric actuator.

In general, the piezoelectric actuator can comprise piezoelectric sub-regions, which result in differing changes in longitude when a voltage is applied. These sub-regions can be formed by the piezoelectric stacks and/or the translation ratio unit.

In particular, the actuating device can comprise an input panel via which inputs are carried out for the electric actuator. For example, the operator can enter on the input panel that the insert is to be adjusted by a certain adjustment travel. Correspondingly, an activation signal, which is conducted to the electric actuator, is then generated by the input panel. The activation signal is in particular a certain voltage, which results in a corresponding change in longitude of the piezoelectric actuator. The change in longitude of the piezoelectric actuator that is carried out corresponds to the desired adjustment travel of the insert, unless a translation ratio unit is provided.

According to a further aspect, at least one adjusting unit is provided in the tool. In this way, a compact tool and a compact setting system are created, since the adjusting unit acting on the insert is directly integrated into the tool.

According to one embodiment, the adjusting unit and the actuating device are provided in the tool. The entire setting system is thus integrated into the tool. This has the advantage that the actuating device is always readily available, so that the operator of the tool is able to change the active diameter of the diameter at any time.

Another embodiment provides for the adjusting unit and the actuating device to be separate components, wherein the actuating device comprises an actuating key in which the electric actuator is provided. The actuating device acting on the adjusting unit is accordingly external and disposed on the tool only as needed. In particular, it is thus possible to use one actuating device for multiple tools and the adjusting units integrated therein, whereby the tools can have a more cost-effective design. Correspondingly, the actuating device comprises an actuating key, which has an interface that can be used to dispose the actuating key on preferably many different tools.

In particular, the adjusting unit and the actuating device can be detachably connected to each other via a mechanical connection, and preferably via a bayonet catch. The separate actuating device can thus be simultaneously disposed and aligned on the tool, and in particular on the adjusting unit. In this way, it is ensured that the actuating device has a predetermined relative position with respect to the adjusting unit, which allows precise setting of the insert. Moreover, the forces occurring during setting can be absorbed, without the operator having to manually hold the actuating device.

It may furthermore be provided for the tool to comprise a capacitor and a dynamo, which is electrically connected to the capacitor and comprises a rotating shank on which the insert is disposed. During operation of the tool, the shank is rotating, wherein the shaft is part of the dynamo so that the rotational movement of the shaft is used to generate electric energy. The generated electric energy can then be stored in the capacitor, via which the setting system is supplied. In this way, autonomous energy supply of the setting system is created since no external power supply unit is required for the setting system.

The tool is preferably a cutting tool, and in particular a boring tool or a fine boring tool, or a reaming or broaching tool, and in particular a reamer. These tools are typically used in metal working. Furthermore, precise and reproducible setting of the insert is important for these tools.

Further advantages and properties of the invention will be apparent from the following description and the drawings being referenced.

DETAILED DESCRIPTION

Figure 1:
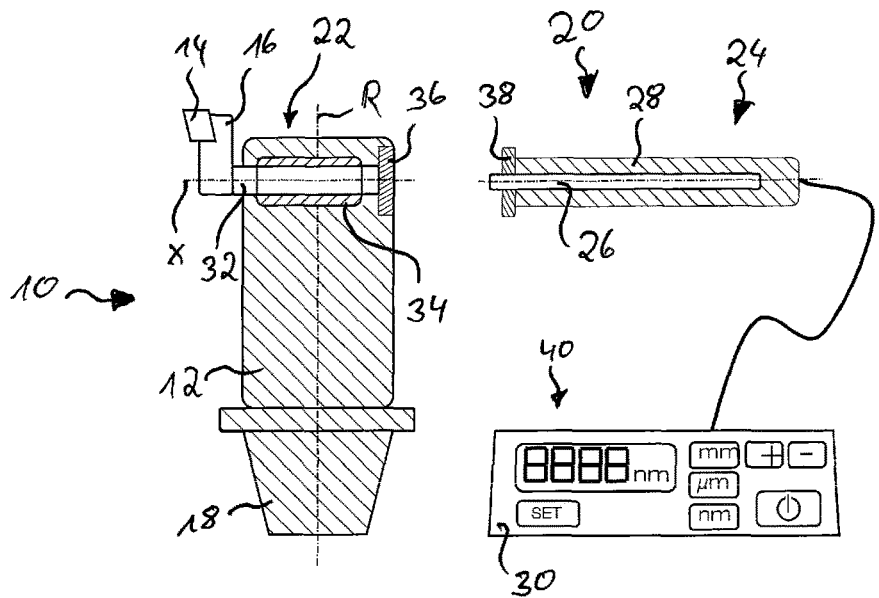
FIG. 1 shows a setting system according to the invention and a tool in a partially cross-sectional representation.

FIG. 1 shows a tool 10, which is designed as a rotary metal working tool, and in particular as a reamer.

The tool 10 comprises a shank 12, which rotates about the rotational axis R and on which an insert 14 is disposed by way of a carrier 16. The insert 14 can be used to widen an existing borehole in a metal piece, wherein the insert 14 runs along the inside of the borehole so as to enlarge the diameter of the borehole.

The tool 10 furthermore comprises a truncated cone 18, via which the spindle 12 can be coupled to a drive, which is not shown here, of the tool 10.

Furthermore, a setting system 20 is shown, which in the shown embodiment is partially integrated into the tool 10.

The setting system 20 comprises an adjusting unit 22, which is disposed in the tool 10 and cooperates with the insert 14, as will be described in more detail hereafter.

The setting system 20 furthermore comprises an actuating device 24, which in the shown embodiment is designed as a component that is separate from the adjusting unit 22 and the tool 10. The actuating device 24 comprises an electric actuator 26, which in the shown embodiment is disposed in an actuating key 28, which can be temporarily provided on the tool 10, as will be described in more detail hereafter.

The actuating key 28 radially surrounds the electric actuator 26, wherein the actuating key 28 has a corresponding central cut-out into which the electric actuator 26 is introduced. An axial end of the actuating key 28 is open, so that access to the cut-out in which the electric actuator 26 is provided is possible at this end.

The actuating device 24 moreover comprises an input panel 30, via which an operator of the setting system 20 and/or of the tool 10 can carry out inputs, which are implemented by the electric actuator 26.

In the shown embodiment, the adjusting unit 22 comprises an adjusting pin 32, which cooperates with the carrier 16 on which the insert 14 is disposed. A clamping unit 34, which can clamp the adjusting pin 32, is assigned to the adjusting pin 32 inside the tool 10, allowing the pin to be held securely in an intended position.

By way of the adjusting pin 32, the carrier 16, and thus the insert 14, can be adjusted along an axis X which is perpendicular to the rotational axis R. The adjustment movement is thus a radial movement with respect to the rotational axis R. The action diameter of the tool 10, or the active diameter of the tool 10, can thus be changed. The exact procedure of the process of adjusting the insert 14 by way of the setting system 20 will be described in more detail hereafter.

The adjusting unit 22 and the actuating device 24 moreover each comprise a bayonet catch 36, 38, which can be detachably connected to each other, so that the actuating device 24 can be disposed on the adjusting unit 22, and in particular the actuating key 28 can be disposed on the tool 10. The actuating key 28 thus has an interface so as to be disposed on the tool 10. This interface is the bayonet catch 38. Due to the universal interface, it is furthermore possible to dispose the actuating key 28 also on other tools 10, provided these tools 10 likewise have a corresponding (universal) interface. The actuating key 28 designed separately from the adjusting unit 22 can accordingly be used for multiple tools.

The electric actuator 26 and/or the clamping unit 34 comprise at least one piezoelectric element, which can be piezoceramics, such as a piezoelectric quartz, or a bimetal having piezoelectric properties, for example. Correspondingly, the electric actuator 26 is a piezoelectric actuator.

The setting system 20 comprises a power supply unit 40 so as to activate the piezoelectric actuator 26 and the clamping unit 34, the power supply unit being integrated into the input panel 30 in the shown embodiment. A voltage is applied to the electric actuator 26, which is to say the piezoelectric actuator, by way of the power supply unit 40, resulting in a change in longitude of the piezoelectric actuator 26.

Figure 2:
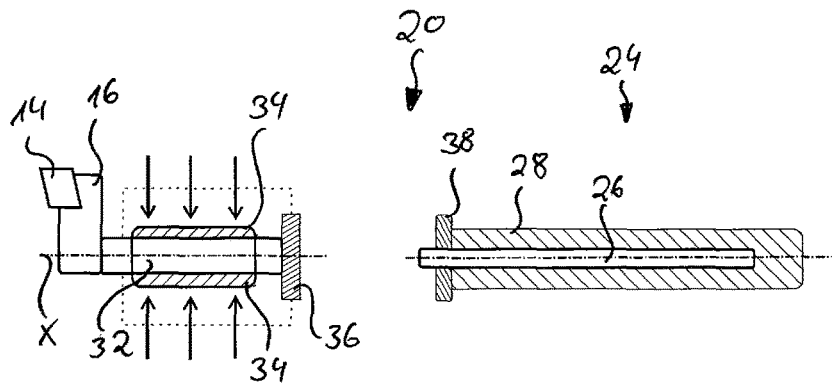
FIG. 2 shows a detailed view of the setting system from FIG. 1.

FIG. 2 shows the tool 10 and the setting system 20 from FIG. 1 in a reduced illustration since the tool 10 is represented only by the dotted line.

In the position shown in FIG. 2, no voltage is present at the clamping unit 34, whereby the piezo element of the clamping unit 34 exerts an inwardly directed force on the adjusting pin 32, securely holding the same. The inwardly directed force is indicated by the arrows.

Figure 3:
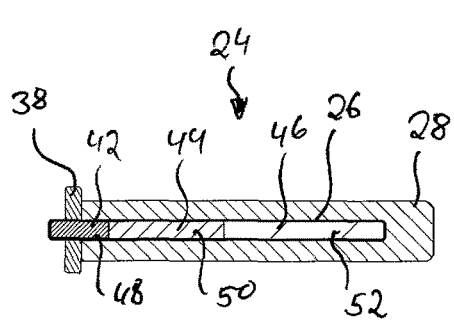
FIG. 3 shows a detailed view of the actuating pin.

In the shown embodiment, as is apparent from FIG. 3, the piezoelectric actuator 26 has three differently designed piezoelectric sub-regions 42 to 46, which result in differing changes in longitude when a voltage is applied to the actuator 26.

This may take place, among other things, by the piezoelectric sub-regions 42 to 46 comprising differently designed piezoelectric stacks 48 to 52. A piezoelectric stack is composed of multiple piezo elements that are coupled to each other and have a correspondingly larger change in longitude than a single piezo element.

In the shown embodiment, the piezoelectric stacks 48 to 52 are different in size, so that an applied voltage results in differing changes in longitude of the respective piezoelectric stack 48 to 52. In this way, it is possible, for example, for the first piezoelectric stack 48 to have a change in longitude in the nanometer range when an appropriate voltage is applied, while the second piezoelectric stack has a change in longitude in the µm range, and the third piezoelectric stack 52 has a change in longitude in the millimeter range.

Alternatively, it may also be provided that essentially similarly sized piezoelectric stacks or piezo elements are provided in the three piezoelectric sub-regions 42 to 46, however that these have differing translation ratios, so that a small change in longitude of the piezo element is translated into a large change in longitude of the respective sub-region 42 to 46 with a corresponding translation ratio. In this way, it is likewise possible to carry out a precise, settable change in longitude of the electric actuator 26, and thus an accordingly precise setting of the insert 14, in particular in the nanometer range.

Based on FIGS. 4a to 4e, it will be described hereafter how the insert 14 of the tool 10 is set precisely using the setting system 20.

Figure 4A:
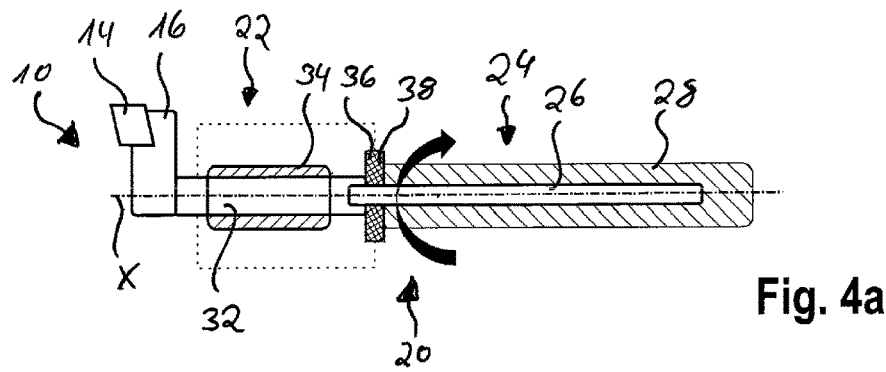
FIGS. 4a to 4e show the setting system according to the invention at different points in time during the setting process.
Figure 4B:
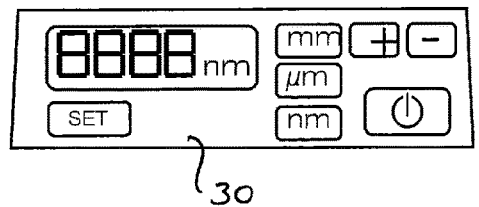
Figure 4C:
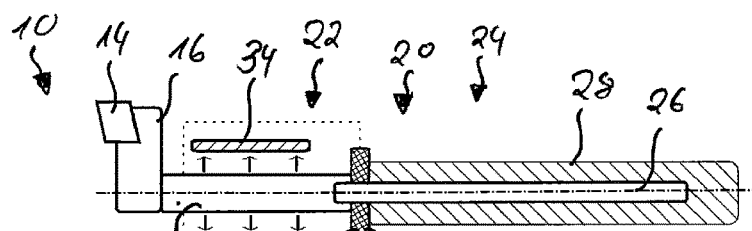
Figure 4D:
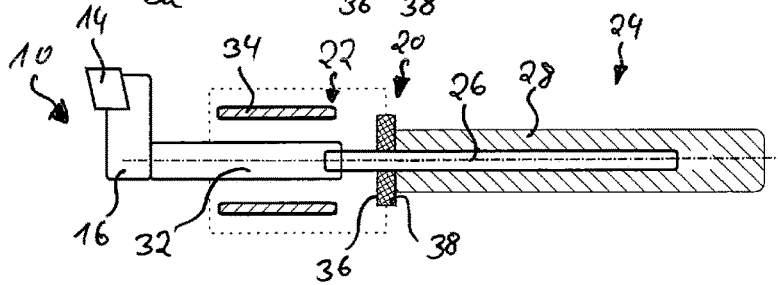

Initially, the actuating device 24 is connected to the adjusting unit 22 by coupling the actuating key 28, via the bayonet catch 38 thereof, to the bayonet catch 36 of the adjusting unit 22 (see FIG. 4a). The two bayonet catches 36, 38 can be designed such that an electrical connection forms, so that the clamping unit 34 can likewise be supplied by the power supply unit 40 of the actuating device 24.

In general, the mechanically detachable connection formed by the bayonet catches 36, 38 ensures that the actuating device 24, and in particular the electric actuator 26, is disposed on the adjusting unit 22 and exactly aligned. This allows a precise actuation of the adjusting pin 32.

Moreover, it is thus possible for the forces occurring during adjustment to be absorbed by the setting system 20 since the counter-force required for the adjusting force can be provided by the bayonet catches 36, 38. The operator thus does not have to manually hold the actuating key 28.

In a next step (see FIG. 4b), the operator of the tool 10 or of the setting system 20 can enter a desired change of the insert 14 or an adjustment travel on the input panel 30.

For this purpose, the operator initially switches the input panel 30 on using the corresponding button. Thereafter, the operator presses the "SET" button, whereby the electric actuator 26 moves initially independently so as to be seated against the adjusting pin 32. This represents the initial position.

Thereafter, the operator can use the corresponding buttons on the input panel 30 to enter that the insert 14 is to be adjusted, for example by adjustment travel of 2.12 mm, 2.02 µm or 3 nm. Precise setting down to the nanometer range is thus possible, provided the piezoelectric actuator 26 has an appropriate sub-region 42 having such a change in longitude.

Thereafter, the clamping unit 34 is supplied with voltage, resulting in a radially outwardly directed change in longitude of the clamping unit 34 with respect to the adjustment axis X. In this way, clamping action is no longer applied to the adjusting pin 32 (see FIG. 4c). The adjusting pin 32 is thus released by the clamping unit 34 and can now be adjusted by the actuating device 24. In this position, the adjusting pin 32 is held, among other things, by the electric actuator 26 and/or by bearing bushings, which are not shown here.

Thereafter, the piezoelectric actuator 26 is supplied with a voltage by the power supply unit 40, resulting in a corresponding change in longitude of the electric actuator 26, which corresponds to the previous input on the input panel 30. A voltage can be applied to all piezoelectric sub-regions 42 to 46 simultaneously or consecutively. It can furthermore be provided that only one sub-region 42 to 46 at a time receives a voltage signal. The adjusting pin 32 and the carrier 16 disposed thereon comprising the insert 14 are then adjusted by the corresponding adjustment travel along the axis X, which is perpendicular to the rotational axis R (see FIG. 4d). In the shown exemplary embodiment, the insert 14 is adjusted radially outwardly with respect to the rotational axis R.

Figure 4E:
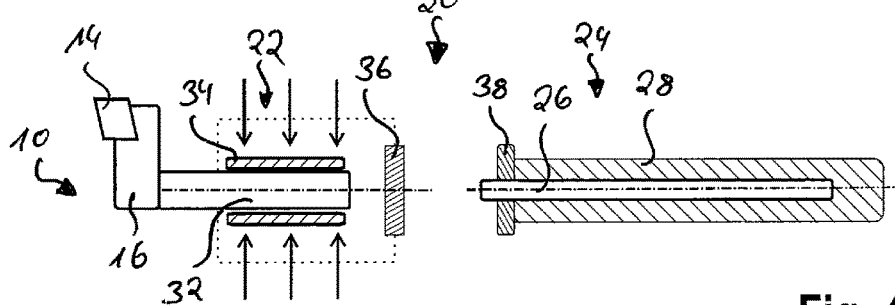

After the insert 14 has reached the desired position or has been adjusted to assume the same, a voltage of the power supply unit 40 is no longer applied to the clamping unit 34, whereby the clamping unit 34 clamps the adjusting pin 32 again (see FIG. 4e). The adjusting pin 32 and the insert 14 disposed thereon are now held in the desired position. The operator of the tool 10 or of the setting system 20 can then release the actuating device 24 from the adjusting unit 22 by opening the bayonet catches 36, 38 again. Thereafter, the operator can pull the actuating pin 28 off the tool 10.

The insert 14 has now been precisely adjusted by a predetermined adjustment travel in the tool 10, independently of the operator.

It can furthermore be provided that the adjusting pin 32 and the electric actuator 26 comprise a thread or another mechanically detachable connection at opposing ends, so that an adjustment of the insert 14 in the other direction compared to the direction shown in FIGS. 4a to 4e is also possible. The insert 14 can thus also be adjusted in a radially further inwardly located direction with respect to the rotational axis R. During this adjustment movement, the actuating device 24, and in particular the electric actuator 26, pulls on the adjusting pin 32, while the electric actuator 26 pushes the adjusting pin 32 in the shown embodiment.

Figure 5:
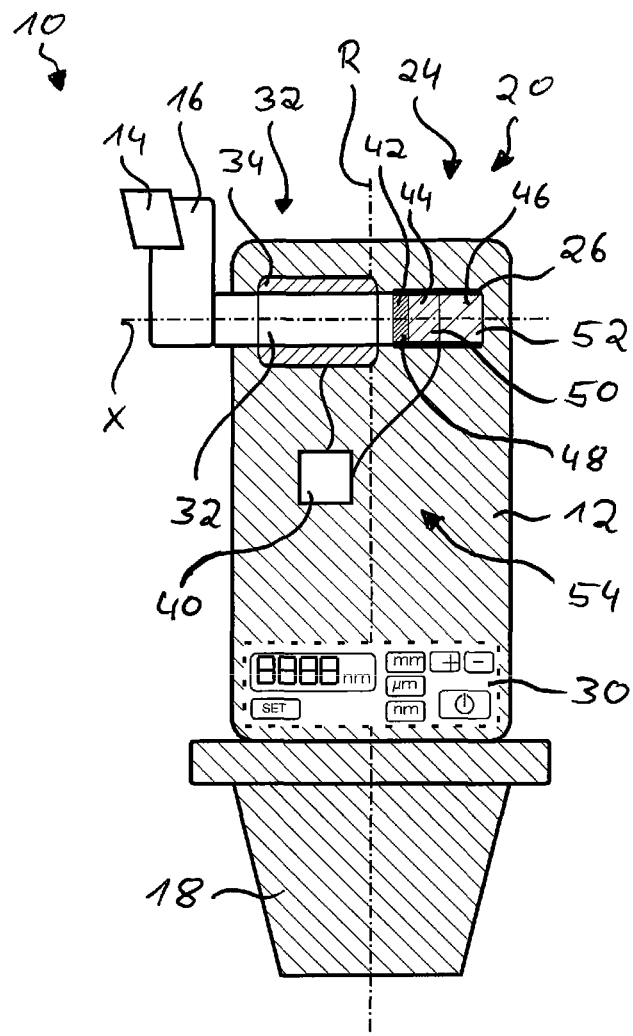
FIG. 5 shows a tool according to the invention comprising an integrated setting system in a cross-sectional illustration.

FIG. 5 shows an alternative embodiment, in which the entire setting system 20 is integrated into the tool 10.

For this purpose, the input panel 30 is disposed on an outside of the shank 12, for example, which is why the input panel 30 is shown in dotted form in FIG. 5. The operator of the tool 10 can thus carry out the inputs directly on the shank 12 of the tool 10.

The electric actuator 26, which in the shown embodiment is likewise integrated into the shank 12, comprises three piezoelectric sub-regions 42 to 46, in which three differently sized piezoelectric stacks 48 to 52 are provided. Analogously to the first embodiment, the electric actuator 26 acts on the adjusting pin 32, which is assigned to the clamping unit 34.

In the shown embodiment, the power supply unit 40 is formed by a capacitor, which is charged by a dynamo 54 included in the tool 10. The dynamo 54 is formed in that the rotation created during operation of the tool 10, which is to say that of the shank 12, is used to generate a voltage, which is temporarily stored in the capacitor.

In this way, it is possible to operate the setting system 20 independently of an external power supply unit. The setting system 20 thus has an autonomous design.

According to the invention, it is thus easily possible to precisely and reproducibly set the insert 14 in the tool 10 in the desired manner. Moreover, setting the insert 14 is energy-efficient since energy is only required during adjustment of the insert 14 so as to release the clamping unit 34 and drive the electric actuator 26.

The invention claimed is:

1. A setting system for aligning at least one insert in a rotary metal working tool, the setting system comprising:

an adjusting unit which cooperates with the insert; and
an actuating device, the actuating device comprising at least one electric actuator exerting an adjusting force on the adjusting unit.

2. The setting system according to claim 1, wherein the adjusting unit comprises an adjusting pin and a clamping unit clamping the adjusting pin.

3. The setting system according to claim 2 further comprising at least one power supply unit to which at least one of the clamping unit and the electric actuator is electrically connected.

4. The setting system according to claim 2, wherein at least one of the electric actuator and the clamping unit comprises at least one piezo element.

5. The setting system according to claim 2, wherein at least one of the electric actuator and the clamping unit is a piezoelectric actuator.

6. The setting system according to claim 2, wherein the electric actuator includes at least two piezoelectric stacks which are different in size.

7. The setting system according to claim 1, wherein the actuating device comprises an input panel via which inputs for the electric actuator are carried out.

8. The setting system according to claim 1, wherein the adjusting unit is provided in the tool.

9. The setting system according to claim 1, wherein the adjusting unit and the actuating device are provided in the tool.

10. The setting system according to claim 1, wherein the adjusting unit and the actuating device are separate components, the actuating device comprising an actuating key in which the electric actuator is provided.

11. The setting system according to claim 10, wherein the adjusting unit and the actuating device are detachably connected to each other via a mechanical connection.

12. A rotary metal working tool comprising:
a setting system for aligning at least one insert in the rotary metal working tool, the setting system comprising:
an adjusting unit which cooperates with the insert; and
an actuating device, the actuating device comprising at least one electric actuator exerting an adjusting force on the adjusting unit.

13. The tool according to claim 12 further comprising a capacitor and a dynamo, the dynamo being electrically connected to the capacitor and comprising a rotating shank on which the insert is disposed.

14. The tool according to claim 12, wherein the tool is a boring tool.

15. The setting system of claim 4, wherein the at least one piezo element comprises at least one of a piezoceramic and a bimetal having piezoelectric properties.

16. The setting system of claim 11, wherein the mechanical connection is a bayonet catch.

17. The method of claim 12, wherein the tool is a reaming tool.

* * * * *